United States Patent
Nohechi et al.

(10) Patent No.: US 10,481,477 B2
(45) Date of Patent: Nov. 19, 2019

(54) PROJECTOR APPARATUS

(71) Applicant: MAXELL, LTD., Kyoto (JP)

(72) Inventors: Hideki Nohechi, Oyamazaki (JP);
Takeshi Katayama, Oyamazaki (JP);
Naoto Kubota, Oyamazaki (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 16/068,285

(22) PCT Filed: Jan. 8, 2016

(86) PCT No.: PCT/JP2016/050505
§ 371 (c)(1),
(2) Date: Jul. 5, 2018

(87) PCT Pub. No.: WO2017/119121
PCT Pub. Date: Jul. 13, 2017

(65) Prior Publication Data
US 2019/0011820 A1    Jan. 10, 2019

(51) Int. Cl.
*G03B 21/20* (2006.01)
*G03B 21/00* (2006.01)
*G02B 7/00* (2006.01)

(52) U.S. Cl.
CPC ........... *G03B 21/208* (2013.01); *G02B 7/008* (2013.01); *G03B 21/008* (2013.01)

(58) Field of Classification Search
CPC ................. G03B 21/28; G03B 21/2066; G03B 21/00–64; G02B 6/00–12033; G02B 7/008; H04N 9/31–3197
See application file for complete search history.

(56) References Cited

U.S. PATENT DOCUMENTS

| 2004/0080722 A1 | 4/2004 | Yamasaki et al. |
| 2004/0141161 A1* | 7/2004 | Hibi .................. G03B 21/28 353/99 |

(Continued)

FOREIGN PATENT DOCUMENTS

| JP | 2004-151674 A | 5/2004 |
| JP | 2004-212759 A | 7/2004 |

(Continued)

OTHER PUBLICATIONS

International Search Report for WO 2017/119121 A1, dated Mar. 22, 2016.

(Continued)

*Primary Examiner* — Cara E Rakowski
*Assistant Examiner* — Christopher A Lamb, II
(74) *Attorney, Agent, or Firm* — Volpe and Koenig, P.C.

(57) ABSTRACT

An illumination optical system of a projector apparatus includes a rod lens which equalizes illuminance of illumination light incident on a micromirror device from lamps, and a plurality of light-shielding plates that shields unnecessary light not incident on the rod lens among the illumination light. The plurality of light-shielding plates is disposed on the incidence side of the rod lens such that each light-shielding plate is provided at a predetermined gap in an optical axis direction of the rod lens. Openings of each light-shielding plate are formed such that a light-shielding plate disposed on an emission side has a smaller passage area of illumination light than on an incidence side.

6 Claims, 6 Drawing Sheets

(56) References Cited

U.S. PATENT DOCUMENTS

| | | | |
|---|---|---|---|
| 2006/0044527 A1 | 3/2006 | Watanabe et al. | |
| 2006/0152689 A1* | 7/2006 | Oh | G02B 6/0096 353/99 |
| 2010/0165301 A1* | 7/2010 | Kojima | G02B 27/48 353/38 |
| 2011/0013145 A1* | 1/2011 | Kato | G02B 27/0994 353/20 |

FOREIGN PATENT DOCUMENTS

| | | |
|---|---|---|
| JP | 2006-065202 A | 3/2006 |
| JP | 2007-248876 A | 9/2007 |
| JP | 2012-189837 A | 10/2012 |
| JP | 2015-169679 A | 9/2015 |
| WO | 2009/118880 A1 | 10/2009 |

OTHER PUBLICATIONS

Japanese Office Action dated Feb. 26, 2019 for the Japanese Patent Application No. 2017-560008.

* cited by examiner

A-A CROSS-SECTION OF LIGHT-SHIELDING PLATE 3a'

PROJECTOR APPARATUS

TECHNICAL FIELD

The present invention relates to a projector apparatus which projects an image, and more particularly to a configuration of an optical component corresponding to a high luminance of a light source.

BACKGROUND ART

There is known a projector apparatus that collects illumination light from a light source to pass through a color wheel, irradiates the illumination light to a digital mirror device (DMD) that is a light modulation element to generate image light, and projects image light onto a screen or the like by a projection lens. In this case, illumination light emitted from the light source needs to be efficiently incident on the DMD via the color wheel.

In general, the illumination light emitted from the light source has a circular shape, and a light guide (rod lens) having a quadrangular prism shape is disposed behind the light source in order to match the illumination light to a rectangular shape of the DMD. However, among the illumination light emitted from the light source, there is light that does not enter the light guide, and in some cases, the light become unnecessary light and may adversely affect an image to be projected. In this regard, a configuration has been proposed in which a light-shielding plate for shielding unnecessary light is provided in the vicinity of an incidence plane or an emission plane of the light guide.

For example, Patent Document 1 proposes a configuration in which unnecessary light (harmful light) is suppressed by disposing a light-shielding plate (mask plate) having a rhombic opening in the vicinity of the emission plane of a light guide (rod integrator).

CITATION LIST

Patent Document

Patent Document 1: JP 2006-65202 A

SUMMARY OF THE INVENTION

Problems to be Solved by the Invention

The projector apparatus is required to have high luminance and high definition of a projected image. In order to achieve this requirement, it is necessary to increase the light emission intensity of the light source, but along with this, the light quantity passing through the light guide (rod lens) increases. In that case, the light quantity of unnecessary light not incident on the light guide also naturally increases. As a result, the light energy received by the light-shielding plate for shielding the unnecessary light increases, and various damages are given to the light-shielding plate. For example, abnormalities such as deformation caused by an increase in temperature of the light-shielding plate and deterioration of the annealing softening characteristics of the material, discoloration and material temperature rise due to carbonization of the precipitate, and swelling due to expansion of bubbles inside the material may occur. As a result, a predetermined light-shielding effect provided by the light-shielding plate cannot be obtained, and unnecessary light increases, which adversely affects the projected image and deteriorates the performance of other optical components inside the device.

As a countermeasure, even if a material with high heat conductivity and high heat resistance is selected as the material of the light-shielding plate, their performances are limited, and there is an obstacle in advancing high luminance. Regarding the shape of the light-shielding plate, increasing the area of the light-shielding plate is not very effective because the area irradiated with unnecessary light is concentrated in the vicinity of the light guide. Further, when the plate thickness of the light-shielding plate is increased, an improvement amount of the heat dissipation effect is small in the steady state after the temperature rises. Regarding the effective countermeasures against such temperature rise of the light-shielding plate, no particular proposal has been made in the related art including the above-mentioned Patent Document 1.

The present invention has been made in view of the above problems, and an object thereof is to provide a projector apparatus capable of suppressing the temperature rise of a light-shielding plate within an allowable range, even if the light emission intensity of a light source is increased.

Solutions to Problems

In order to solve the above problems, the present invention provides a projector apparatus which includes a light source which generates illumination light, an illumination optical system which collects the illumination light from the light source, a micromirror device which optically modulates the illumination light by displacing a plurality of mirror elements to generate image light, and a projection lens which projects the image light. The illumination optical system has a rod lens which equalizes illuminance of the illumination light incident on the micromirror device, and a plurality of light-shielding plates which shields unnecessary light not incident on the rod lens among the illumination light. The plurality of light-shielding plates is disposed on the incidence side of the rod lens such that each light-shielding plate is provided at a Predetermined gap in an optical axis direction of the rod lens.

Effects of the Invention

According to the present invention, even if the light emission intensity of the light source is increased, the temperature rise of the light-shielding plate can be suppressed within an allowable range, which contributes to realization of high illuminance and an improvement in reliability of the projector apparatus.

MODE FOR CARRYING OUT THE INVENTION

Figure 1:
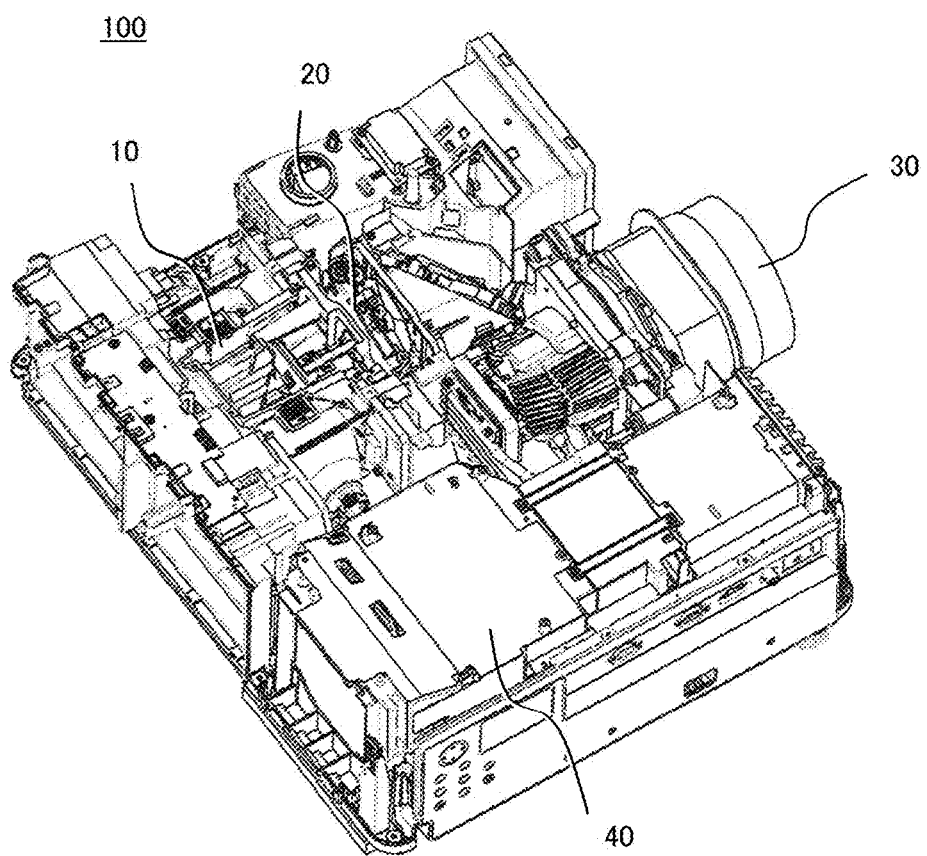
FIG. 1 is a perspective view illustrating an internal configuration of a projector apparatus.

Hereinafter, embodiments of the present invention will be described with reference to the drawings. In each of the drawings, the same parts are dented by the same reference numerals, and repeated description for those described once will not be provided.

FIG. 1 is a perspective view illustrating an internal configuration of a projector apparatus, and illustrating a state in which an upper cover is removed. A projector apparatus 100 includes a light source unit 10 that houses a lamp, an optical engine 20 such as an illumination optical system such as a rod lens or a color wheel and a digital mirror device (DMD) that generates image light, a projection lens 30 that projects image light, and a power supply unit 40. Further, the projector apparatus 100 includes a cooling unit such as an intake fan or an exhaust fan for sending cooling air to the light source unit 10 or the optical engine 20, and a control unit which controls the power supply unit 40, the light source unit 10, the optical engine 20, the cooling unit, and the like. Hereinafter, the configuration of the light source unit and the illumination optical system will be mainly described.

Figure 2:
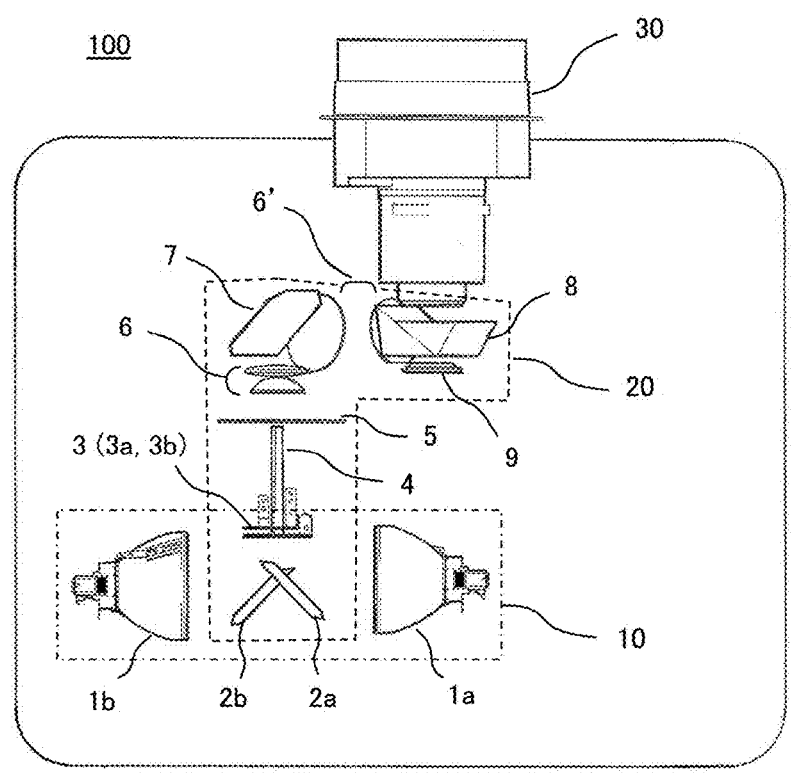
FIG. 2 is a top view illustrating a configuration of an optical system of the projector apparatus.

FIG. 2 is a top view illustrating a configuration of an optical system of the projector apparatus. In the light source unit 10, two discharge lamps 1a and 1b serving as light sources are disposed so as to face each other to generate illumination light. By using, for example, an extra-high pressure mercury lamp or the like for the discharge lamps 1a and 1b, high-intensity intensity illumination light can be efficiently generated. The generated illumination light is efficiently condensed by a reflector having a reflection surface of a revolving ellipsoid or revolving paraboloidal surface. The light source is not limited to the discharge lamps 1a and 1b, but for example, an LED light source or a laser light source can also be used.

Illumination light emitted from the two discharge lamps 1a and 1b (hereinafter simply referred to as "lamps") is reflected by respective mirrors 2a and 2b, synthesized to travel upward in the drawing, and supplied to the optical engine 20. As described above, in this embodiment, the two lamps 1a and 1b are provided to achieve high illuminance, but it is, of course, possible to configure the lamps with one lamp or three or more lamps. Alternatively, only one of the plurality of lamps may be turned on.

The illumination light reflected by the mirrors 2a and 2b is incident on a rod lens (a light guide) 4 which equalizes the illuminance of illumination light by multiple reflection. At that time, by disposing the light-shielding plate 3 on the incident surface side of the rod lens 4, unnecessary light which does not enter the rod lens 4 among the illumination light from the mirrors 2a and 2b is shielded. That is, when propagating the unnecessary light as it is, a projected image is adversely affected, which causes temperature rise of each part in the device, deterioration of plastic parts and the like, and deteriorates the performance and reliability of the device. In the present embodiment, a plurality of light-shielding plates is provided as the light-shielding plate 3 (in the following example, the case of the two light-shielding plates is illustrated). At the central part of the light-shielding plate 3, there is an opening through which light passes to the rod lens 4, and the periphery thereof is a light-shielding part which shields light. Details of the light-shielding plate 3 will be described later.

The rod lens 4 is made up of, for example, a hollow element formed by bonding four quadrangular prisms of glass or four reflection mirrors, and the cross-sectional shape of the emission plane of the rod lens 4 is set to be the same as the aspect ratio of a digital mirror device (DMD) 9 which is the light modulation element. Inside the rod lens 4, the illumination light is reflected for a plurality of times, and a light distribution similar to the DMD 9 and having a uniform intensity is provided on the emission plane.

On the emission plane side of the rod lens 4, a color wheel 5 which is a rotary type color filter is disposed. The color wheel 5 has six types of fan-shaped transmissive color filters (for example, R (red), G (green), B (blue), C (cyan), Y (yellow), and W (white)) disposed in a circumference (rotation) direction. Alternatively, the color wheel 5 may be three kinds of color filters consisting of R, G and B. By rotating the color wheel 5, the illumination light emitted from the rod lens 4 is divided into light of six colors (R, B, C, Y, and W) in a chronological order.

Each color light emitted from the color wheel 5 is irradiated onto the DMD 9 via relay lenses 6 and 6', a mirror 7, and a TIR prism (total internal reflection prism) 8. At this time, the relay lenses 6 and 6' function to prevent divergence of light emitted from the color wheel 5 and also to enlarge the light distribution uniformized on the emission plane of the color wheel 5 on the surface of the DMD 9. The TIR prism 8 totally reflects the incident light and guides the incident light to the DMD 9.

The digital mirror device (DMD) 9 is a device that optically modulates the illumination light to generate image light by individually displacing (inclining) a plurality of two-dimensionally arranged mirror elements. The inclination of each mirror element has an ON state and an OFF state. In the ON state, the mirror element reflects the illumination light toward the projection lens 30 (white image), and in the OFF state, the mirror element reflects the illumination light to the part other than the projection lens 30 (black image). Further, by changing the time of the ON/OFF state, gradation can be imparted to an image.

The DMD 9 is synchronized with the rotation of the color wheel 5 by the control unit of the projector apparatus 100, and generates image light based on an image signal for each color light emitted from the color wheel 5. Since the image light generated by the DMD 9 has an angle that does not satisfy the total reflection angle with respect to the TIR prism 8, the image light passes through the TIR prism 8 and is incident on the projection lens 30. Thereafter, the image light is enlarged and projected onto a screen or the like by the projection lens 30 and displayed thereon.

Figure 3:
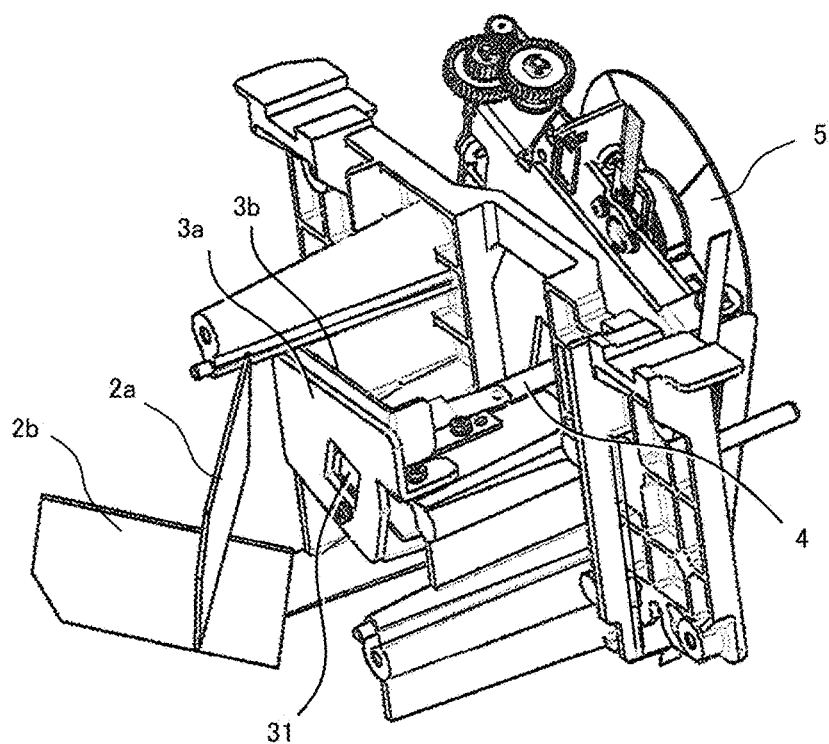
FIG. 3 is a perspective view illustrating a configuration in the vicinity of a light-shielding plate and a rod lens.

FIG. 3 is a perspective view illustrating the configuration of the vicinity of the light-shielding plate 3 and the rod lens 4. In the present embodiment, two light-shielding plates 3a and 3b are provided as the light-shielding plate 3 (distinguished from "first light-shielding plate" and "second shielding plate", respectively, if necessary). Each illumination light emitted from the lamp 1a and the lamp 1b is reflected by the mirrors 2a and 2b and is synthesized. The illumination light passes through the first light-shielding plate 3a and the second light-shielding plate 3b in this order and enters the rod lens 4. The color wheel 5 is disposed on the emission side of the rod lens 4. The mirrors 2a and 2b, the light-shielding plates 3a and 3b, the rod lens 4, and the color wheel 5 are attached to a common base. In a case where there is no problem in positional accuracy etc., these parts may be attached to separate bases.

Here, the two light-shielding plates 3a and 3b are substantially orthogonal to the optical axis direction of the rod lens 4, and the light-shielding plates 3a and 3b are arranged with a predetermined gap in the optical axis direction in order to enhance heat dissipation properties. Each of the light-shielding plates 3a and 3b has an opening 31 at a position corresponding to the incidence plane of the rod lens 4, and the periphery thereof is a light-shielding part which shields unnecessary illumination light (unnecessary light) from the mirrors 2a and 2b. As will be described later, the passage areas of the openings 31 of the two light-shielding plates 3a and 3b are different, and are formed such that the second light-shielding plate 3b (emission side) has a smaller passage area than the first light-shielding plate 3a (incidence side).

By providing the two light-shielding plates in this manner, irradiation of unnecessary light from the mirrors 2a and 2b can be shared by the two light-shielding plates. As a result, the heat capacity per one light-shielding plate decreases, and the temperature rise of the light-shielding plate can be suppressed. In the present embodiment, a configuration in which the two light-shielding plates 3a and 3b are substantially orthogonal to the optical axis direction of the rod lens 4 as described above will be described. However, one of the following configurations may be used.

(1) The light-shielding plates 3a and 3b are arranged substantially in parallel and substantially orthogonally to the optical axis direction of the rod lens 4.

(2) The light-shielding plates 3a and 3b are arranged substantially in parallel and non-orthogonally to the optical axis direction of the rod lens 4.

(3) The light-shielding plates 3a and 3b are arranged in non-parallel and one of the light-shielding plates 3a and 3b is arranged substantially orthogonally to the optical axis direction of the rod lens 4.

(4) The light-shielding plates 3a and 3b are arranged in non-parallel and non-orthogonally to the optical axis direction of the rod lens 4.

In the case of the constitutions of (2), (3), and (4), it is possible to further reduce the return light from the light-shielding plates 3a and 3b to the lamps 1a and 1b than in the case (1), and the rise in lamp temperature can be suppressed.

As the material of the light-shielding plates 3a and 3b, for example, an aluminum material is suitable. This is because the aluminum material is excellent in specific heat and thermal conductivity and can quickly diffuse or dissipate the heat generated by the illumination light to the entire light-shielding plate. In addition, an Al single composition (pure aluminum, purity of 99% or more) is more preferable than an alloy composition (for example, Al—Mg) for avoiding discoloration (precipitate) and swelling caused by temperature rise. However, when there is return light of the illumination light by the light-shielding plate, the return light enters the lamps 1a and 1b and causes the temperature rise. Thus, at least for the light-shielding plate 3a on the incidence side, it is necessary to lower the reflectance of the illumination light. For that purpose, it is effective to subject the surface of the light-shielding plate to processing for lowering the reflectance (for example, blasting, edging, alumite treatment, etc.) to obtain a roughened state. Furthermore, in a case where the reflection of the illumination light to the lamps 1a and 1b is reduced, the light-shielding plate 3b is also subjected to processing of obtaining the roughened state.

Here, the effect of reducing the reflectance by rough surface processing will be specifically described. Measurement values of the reflectance in a wavelength band of 800 to 300 nm are illustrated.

COMPARATIVE EXAMPLE

Al—Mg alloy (A 5052), no rough surface processing
Reflectance 25.5 to 8.0% (average value 17.7%)

EXAMPLES

Pure Al (A 1050) with blasting
Reflectance 0.87 to 0.61% (average value 0.8%)
In this way, by changing the material of the light-shielding plate 3 to pure aluminum and by performing the blasting, the average reflectance can be reduced from about 18% to about 1%. As a result, the temperature rise of the lamps 1a and 1b can be suppressed.

Figure 4:
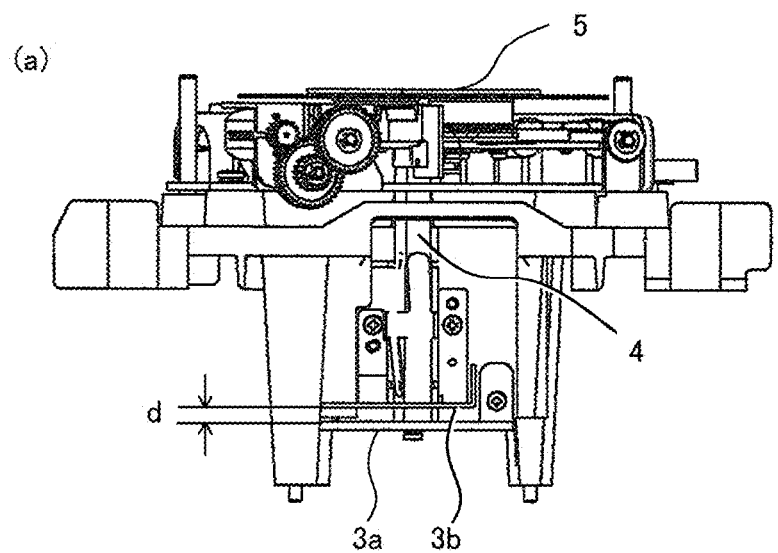
FIG. 4 is a diagram illustrating a shape and an arrangement of the light-shielding plate.
Figure 4:
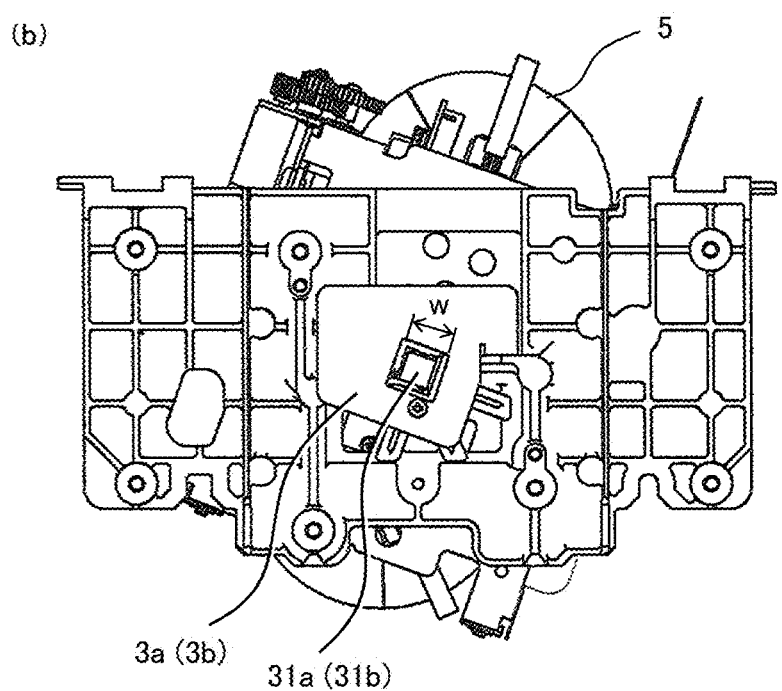

FIG. 4 is a view illustrating the shape and arrangement of the light-shielding plate 3, FIG. 4(a) is a top view of the device (a side view of the light-shielding plate), and FIG. 4(b) is a side view of the device (a front view of the light-shielding plate).

FIG. 4(a) illustrates the side surface shape of the light-shielding plates 3a and 3b, the two light-shielding plates 3a and 3b are disposed on the incidence side of the rod lens 4 so as to be substantially orthogonal to the optical axis direction, and the tip thereof is bent in an L shape and is fixed to the base with screws. The two light-shielding plates 3a and 3b are provided with a gap d to improve the heat dissipation by the cooling air. The thickness of the light-shielding plates 3a and 3b is set such that the first light-shielding plate 3a is thicker than the second light-shielding plate 3b in consideration of the temperature rise due to irradiation.

FIG. 4(b) illustrates an outer shape of the light-shielding plates 3a and 3b, and the light-shielding plates 3a and 3b have a quadrilateral shape (trapezoidal shape) and have openings 31a and 31b at the central part, respectively. Here, the openings 31a and 31b have a square shape, and a size W thereof in the second light-shielding plate 3b is set to be smaller than in the first light-shielding plate 3a. That is, when viewed from the incidence side, the peripheral portion of the second opening 31b is visible in the first opening 31a. Further, regarding the outer shape of the second light-shielding plate 3b, since the irradiation regions of unnecessary light are different, it is not necessary to have the same shape as that of the first light-shielding plate 3a. Further, in consideration of easiness of attachment to the base, the second light-shielding plate 3b may be in the form of a half piece obtained by cutting out part of the outer shape.

Figure 5:
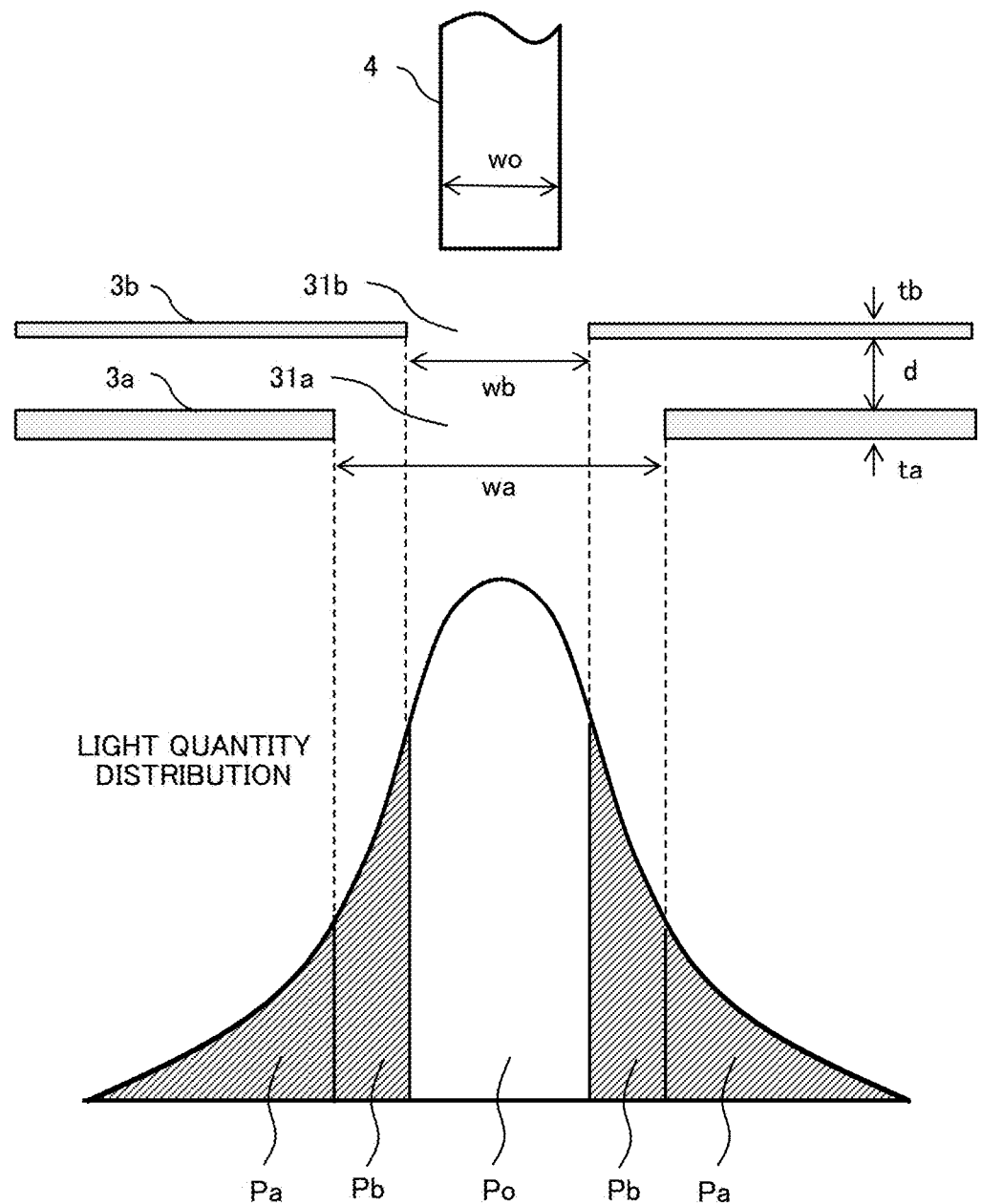
FIG. 5 is a diagram schematically describing an effect of reducing temperature rise provided by two light-shielding plates.

FIG. 5 is a diagram schematically describing the effect of reducing the temperature rise by the two light-shielding plates. The two light-shielding plates 3a and 3b having openings 31a and 31b are arranged with respect to the rod lens 4. As an example of the dimensions, the size wo of the rod lens 4 is 7 mm, the thicknesses ta and tb of the light-shielding plates 3a and 3b are 2 mm and 1 mm, respectively, and the gap d is 3.5 mm. The sizes wa and wb of the openings 31a and 31b are 11.9 mm and 8.6 mm, respectively. Both the cross sections of the rod lens 4 and the openings 31a and 31b are square.

In this case, the illumination light enters from below the drawing, and has, for example, a light quantity distribution as illustrated in the drawing. Among the illumination light, the light quantity of a central part Po capable of passing through the second opening 31b can enter the rod lens 4. Other illumination light is shielded by the first light-shielding plate 3a or the second light-shielding plate 3b. In this example, since the size of the first opening 31a and the size of the second opening 31b is set to be a relationship of wa>wb, the light quantity irradiated to the first light-shielding plate 3a can be shared by a portion of Pa, and the light quantity irradiated to the second light-shielding plate 3b can be shared by a portion of Pb. Heat generation accompanying the assigned light quantities Pa and Pb diffuses into the first light-shielding plate 3a and the second light-shielding plate 3b, respectively, and is dissipated by cooling air.

That is, as compared with a conventional case where only one light-shielding plate is used, the heat generation quantity per one sheet is reduced, using the two light-shielding plates. By appropriately setting the size of the opening and the plate thickness of the light-shielding plate in accordance with the light quantity distribution of the illumination light, the heat generation quantity (or temperature rise) of the first light-shielding plate 3a and the second light-shielding plate 3b can be made substantially the same. Further, since the gap d is provided between the two light-shielding plates 3a and 3b, the heat dissipation effect by the cooling air is not inferior to the case of a single light-shielding plate. As a result, the temperature rise of the light-shielding plate can be reduced as compared with the case of a single light-shielding plate.

Figure 6:
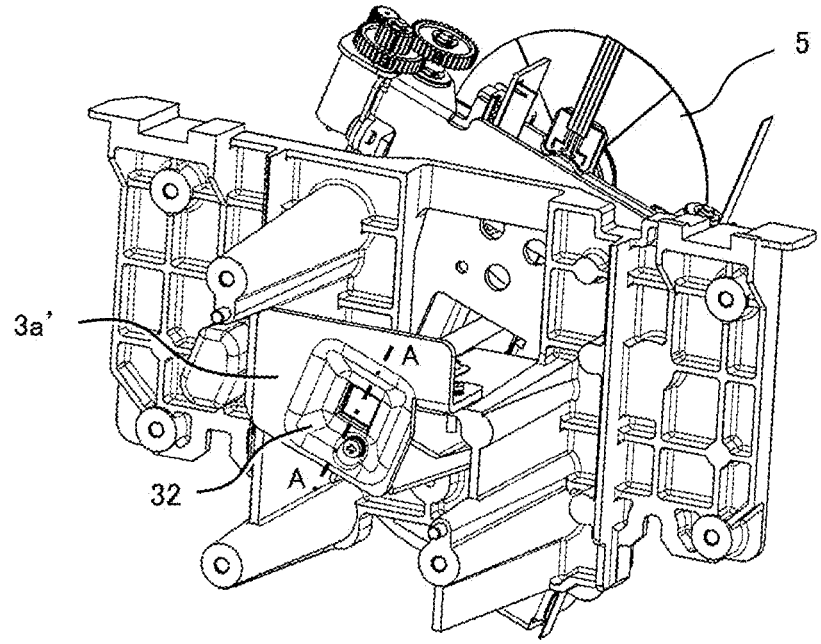
FIG. 6 is a diagram illustrating a modified example of the shape of the light-shielding plate.
Figure 6:
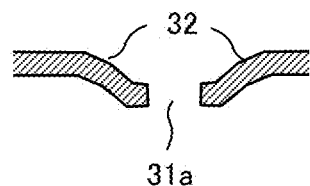

FIG. 6 is a diagram illustrating a modified example of the shape of the light-shielding plate. In this example, in a first light-shielding plate 3a', an inclined surface 32 having a concave shape on the incidence side is formed in the light-shielding part around the opening 31a. If the unnecessary light irradiated on the first light-shielding plate 3a' is reflected to the side of the lamps 1a and 1b, the return light causes deterioration of the lamp. Therefore, by forming the concave inclined surface 32 like the light-shielding plate 3a', the return light deviates from the optical axis direction, the light quantity returning to the lamp decreases, and the deterioration of the lamp can be prevented. Formation of the inclined surface 32 like the light-shielding plate 3a' can be easily produced by drawing or the like. Further, for the second light-shielding plate 3b, only the region surrounding the opening 31b irradiated with unnecessary light may be formed as an inclined surface. Furthermore, if the surface of the light-shielding plate is subjected to blasting, edging, alumite treatment or the like to reduce reflectance of the illumination light, the return light to the lamp can be further reduced.

According to the present embodiment, even if the light emission intensity of the lamp is increased, the temperature rise of the light-shielding plate can be suppressed within the allowable value. For example, in a case where only one light-shielding plate is used, the temperature rise sometimes reaches about 290° C. However, the temperature rise can be reduced to about 230° C., using the two light-shielding plates, and it is possible to keep the temperature rise below the allowable temperature. These contribute to realization of high luminance and improvement in reliability of the projector apparatus.

Although the embodiments of the present invention have been described above, the present invention is not limited thereto, and the present invention can be practiced without changing the gist thereof. For example, although the case of using the two light-shielding plates has been described by way of example, it goes without saying that a configuration in which the number of the light-shielding plates is increased to three or more may be employed. By increasing the number of light-shielding plates, it is possible to further suppress the temperature rise of the light-shielding plate. Further, the shape, dimension and the like of each light-shielding plate may be appropriately determined in accordance with the intensity and distribution of the illumination light from the light source.

REFERENCE SIGNS LIST 1a, 1b discharge lamp (light source)
2a, 2b mirror
3, 3a, 3b, 3a' light-shielding plate
4 rod lens (light guide)
5 color wheel
6, 6' relay lens
7 mirror
8 total internal reflection (TIR) prism
9 digital mirror device (DMD)
10 light source unit
20 optical engine
30 projection lens
31, 31a, 31b opening
32 inclined surface
40 power supply unit
100 projector apparatus

The invention claimed is:

1. A projector apparatus which includes a light source which generates illumination light, an illumination optical system which collects the illumination light from the light source, a micromirror device which optically modulates the illumination light by displacing a plurality of mirror elements to generate image light, and a projection lens which projects the image light,
wherein the illumination optical system has a rod lens which equalizes illuminance of the illumination light incident on the micromirror device, and a plurality of light-shielding plates which shields unnecessary light not incident on the rod lens among the illumination light, and
the plurality of light-shielding plates is disposed on the incidence side of the rod lens such that each light-shielding plate is provided at a predetermined gap, and
wherein the shielding of unnecessary light causes a suppression of a rise in temperature of the plurality of light-shielding plates.

2. The projector apparatus according to claim 1, wherein the plurality of light-shielding plates has respective openings through which the illumination light passes to the rod lens, and
areas of the openings of each light-shielding plate are different from each other, and a passage area of the illumination light is formed such that the light-shielding plate disposed on an emission side is smaller than on an incidence side.

3. The projector apparatus according to claim 2, wherein the light-shielding plate disposed at least closest to the incidence side among the plurality of light-shielding plates has an inclined surface around the opening.

4. The projector apparatus according to claim 1, wherein a light-shielding plate disposed at least closest to the incidence side among the plurality of light-shielding plates has a low reflectance by processing the surface to a roughened surface state.

5. The projector apparatus according to claim 1, wherein the plurality of light-shielding plates is processed to have a roughened surface state on the surface of the incidence side of each of the light-shielding plates, and has a low reflectance.

6. The projector apparatus according to claim 5, wherein a single aluminum composition is used as a material of the plurality of light-shielding plates.

* * * * *